Figure 1:
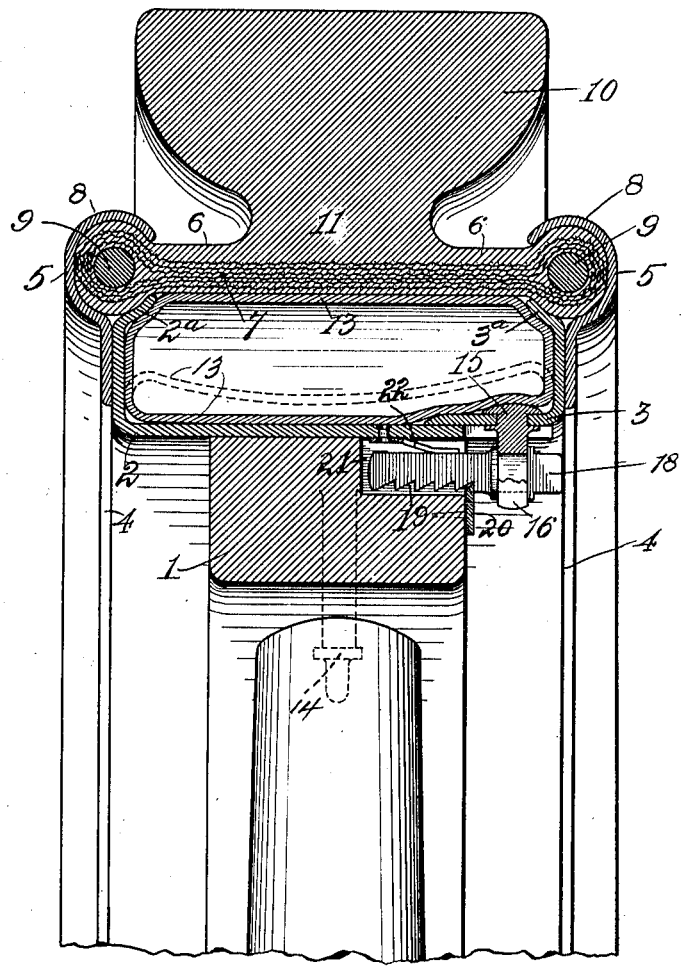

W. D. McNAULL.
VEHICLE TIRE.
APPLICATION FILED APR. 5, 1909.

970,535.

Patented Sept. 20, 1910.

2 SHEETS—SHEET 1.

WITNESSES.
Marie Hahn
Leona Kilburtz

INVENTOR.
Wm D. McNaull

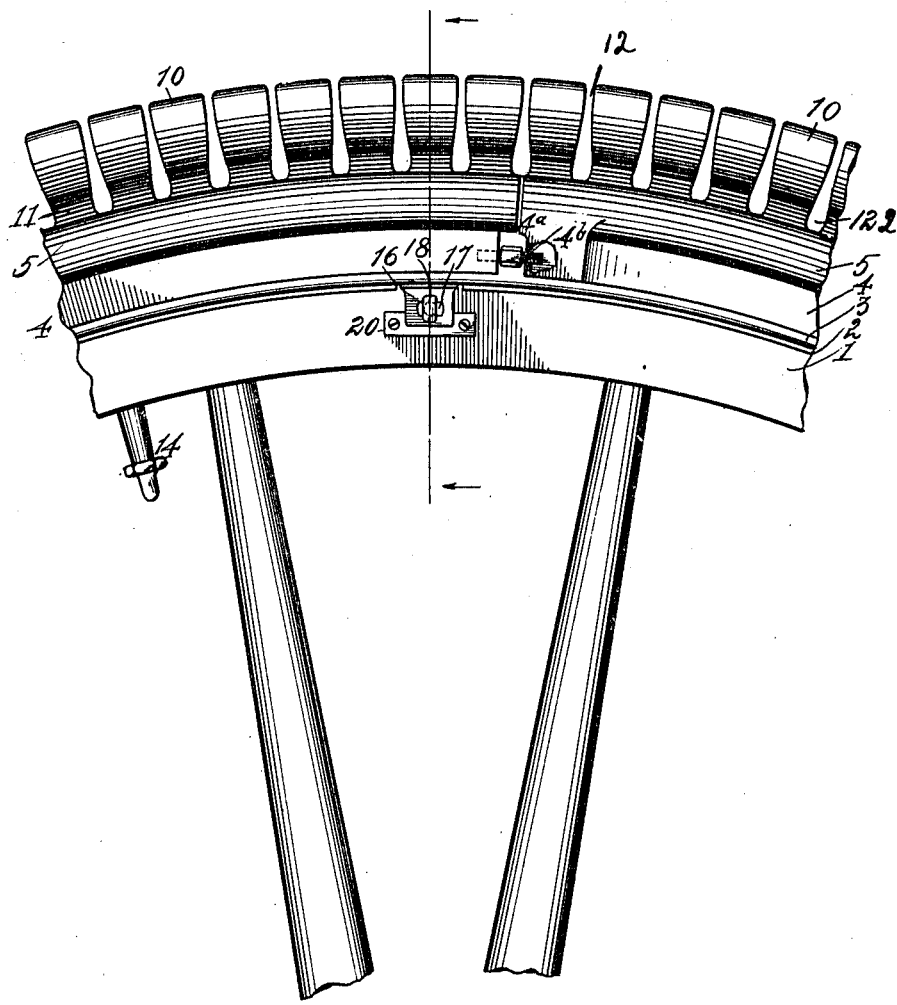

UNITED STATES PATENT OFFICE.

WILLIAM D. McNAULL, OF TOLEDO, OHIO.

VEHICLE-TIRE.

970,535.  Specification of Letters Patent.  Patented Sept. 20, 1910.

Application filed April 5, 1909.  Serial No. 487,857.

*To all whom it may concern:*

Be it known that I, WILLIAM D. Mc-NAULL, a citizen of the United States, residing at Toledo, in the county of Lucas and State of Ohio, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
My invention relates to tires for vehicles, and is designed to furnish a construction which shall add to the durability of the tire and which shall greatly increase its elasticity.
My invention is also designed to furnish cheap, simple, and effective means for securing my tire in place upon the rim of a wheel; also to provide a construction by means of which the inner pneumatic tube is protected against abrasion and injury, and by which the durability of such tube is greatly increased.

My invention is also designed to increase the effective traction surface of a vehicle tire without increasing its width or weight, and by the same means to furnish an "anti-skidding" device of great efficiency.

I attain these objects by means of the devices, construction and arrangement of parts hereinafter described, and shown and illustrated in the accompanying drawings, in which—

Figure 1 is a transverse sectional elevation of my tire in place upon the rim of a wheel and Fig. 2 a side elevation of a segment of a wheel provided with my tire.

Corresponding numerals indicate like parts in both views.

In the drawings, 1 is the felly of a wheel, the periphery of which is embraced by rim-part 2 rigidly secured to the felly and upon which slides transversely rim-part 3. The two rim parts have respectively outwardly turned radial flanges, which at their outer margins are turned toward each other, as at $2^a$—$3^a$. The rim parts 2—3 and their flanges form a circumferential channel around the wheel.

4—4 are ring-like plates split transversely as at $4^a$, the meeting ends being secured together by means of turn-buckle $4^b$. The inner flattened portions of plates or rings 4 rest against the flanges of the parts 2—3, the outer portion of the plates being curved transversely, as at 5, to form in conjunction with the flanged parts $2^a$—$3^a$ circumferential recesses for the reception of the enlarged flanges of the outer rubber tire—to be described.
6 is a flat band or belt,—preferably continuous,—composed preferably of suitable vulcanized india-rubber and reinforced as by means of a fabric of suitable material, as at 7. The margins of the belt 6 are enlarged transversely, as at 8, the enlarged portions having a core 9 of vulcanized rubber or other suitable material. Projecting radially outwardly from the belt 6, midway of its width, is a continuous series of cushions 10, formed integral with the belt and connected therewith by means of comparatively narrow necks 11. The cushions at their peripheral portions are broadened transversely sufficiently to overhang or overlap somewhat the curved flanges 5 of the parts 4. The cushions 10 are separated from each other by narrow transverse spaces 12 which are somewhat widened at their bottom or inner portion, as at $12^2$.
Within the circumferential space bounded by the rim-parts 2—3 and the belt 7 is a pneumatic tube 13 of the usual or any preferred construction (shown in dotted lines as deflated) and provided with inflating tube and valve 14 of the usual or any preferred construction. First one and then, the other of the marginal flanges 8 of the belt 6 are engaged by the curved plates 5 and the parts $2^a$—$3^a$ of the rim-parts, and the belt 6 is then stretched tightly by the transverse outward movement of the rim part 3 upon the stationary rim part 2. This movement of the rim part 3 is effected by the inflation of the pneumatic tube 13, the pressure of which against the flange of the rim-part 3 causes the part 3 to slide upon the part 2, thus tightly clamping the enlarged margins of the belt 6 in place. The part 3 is prevented from slipping backwardly and is held in the position to which it may be moved by means of the devices now to be described.

Secured as at 15 to the rim part 3 at regular intervals and projecting radially inwardly toward the hub of the wheel are plates 16, each having transversely therethrough an aperture 17 through which passes a bolt 18 substantially rectangular in cross-section and having on one side ratchet teeth 19 adapted to engage the edge of a plate 20 secured to the felly of the wheel. The bolt projects into and reciprocates in a recess 21 in the felly. The teeth of the bolt are held normally in engagement with the plate 20 by means of a spring 22 secured to the wall of the recess and pressing upon the bolt. As the rim part 3 moves laterally outwardly, it carries with it the bolt 18 the notches of which fall successively into engagement with the plate 20 holding the rim part from slipping back, the spring 22 holding the teeth and the plate 19—20 in engagement. When it is desired to slide the rim part 3 inwardly to release the flanges 8,— to permit the removal or application of the tire or for any other reason,—it is only necessary to give the bolt 18 a quarter-turn with a suitable wrench,—the spring 22 yielding to this operation,—when the teeth 19 are disengaged from the plate 20 and the inward movement of the rim part 3 is now unobstructed. The teeth of the bolts 18 may be pried into successive engagement with the plate 20 by means of a suitable tool and thus the bolt may be tightened transversely independently of the inflation of the tube 13.

It will be seen that the belt 6, suspended by its margins, forms a strong resilient tire of itself; that in case of accident to the inner pneumatic tube the tire still remains sufficiently efficient and elastic to permit the vehicle to be run until repairs can be conveniently made; that the series of radial cushions 10 with their highly elastic necks add greatly to the resiliency of the tire; that when these cushions are on the underside of the wheel and supporting the weight of the vehicle, the cushions are compressed so that they come in contact with their neighboring cushions forming a shield and spring which is practically puncture proof; that the pneumatic tube,—which adds further elasticity to the device,—is fully protected on all sides from puncture, and that the wear and abrasion of this tube are reduced to a minimum by reason of its location in a chamber, three sides of which are stationary and are of metal.

Having described my invention, what I claim and desire to secure by Letters Patent is,—

1. In a device of the described character, a circumferentially channeled wheel-rim, a flexible band circumferentially mounted upon the wheel-rim and transversely tensioned across the channel of the rim, there being formed integral with said band, a series of outwardly projecting radial elastic cushions.

2. In a device of the described character, a circumferentially channeled wheel-rim, a flexible band circumferentially mounted upon the wheel-rim and bridged transversely across said circumferential channel, means for adjusting the transverse tension of said band, and a series of radially outwardly projecting elastic cushions formed integral with said band.

3. In a device of the described character, a band of flexible material having formed integral therewith, a series of radially projecting cushions, said cushions being of less transverse area at their base than at their summit, combined with a circumferentially channeled wheel-rim, and means for tensioning the band transversely across such channel.

4. In a device of the described character, a felly, a rim part secured to the felly, another rim part transversely slidable upon the rim part first mentioned, said two-rim parts having radially turned flanges, forming therebetween a circumferential channel, means for securing said two rim parts in adjusted relation, a flexible belt transversely bridged and tensioned across said channel, there being a continuous series of elastic cushions formed integral with said belt and projecting radially outwardly therefrom, and means for securing the margins of said belt upon the flanges of the rim parts.

In testimony whereof I affix my signature in presence of two witnesses.

WILLIAM D. McNAULL.

Witnesses:
L. A. ROWLEY,
LEONA KIBURTZ.